United States Patent Office 2,966,455
Patented Dec. 27, 1960

2,966,455

REFINING HYDROCARBONS WITH HYDRAZINES AND HYDROGENATION CATALYSTS

Archibald P. Stuart, Media, Pa., assignor to Sun Oil Company, Philadelphia, Pa., a corporation of New Jersey No Drawing. Filed Aug. 14, 1957, Ser. No. 678,032

8 Claims. (Cl. 208—254)

This invention relates to the refining of hydrocarbons, and more particularly to the conversion of unstable constituents of hydrocarbon mixtures.

Naturally occurring hydrocarbon mixtures such as petroleum and shale oil frequently contain unstable constituents, e.g. nitrogen compounds, which cause the hydrocarbon fractions to have unsatisfactory properties with regard to color stability, oxidation stability, etc. It is desirable to provide hydrocarbon treating processes which are capable of giving good conversion, and preferably selective conversion, of the unstable constituents at relatively mild treating conditions. According to the present invention, a treating method is provided which gives good conversion at relatively mild treating conditions, and is capable of providing highly selective conversion of the unstable constituents in preference to other constituents of the hydrocarbon fractions.

The treating process according to the invention involves contacting hydrocarbon with a nitrogenous treating agent as subsequently specified, in the presence of a metallic hydrogenation catalyst. The treatment provides particularly rapid and effective conversion of the unstable constituents, and it is believed that the hydrogenation catalyst contributes to this result by promoting and accelerating the decomposition of the nitrogenous treating agent to produce a decomposition product which is particularly effective as a reducing agent for the unstable constituents of the hydrocarbons.

The nitrogenous treating agent according to the invention comprises a compound having the following formula:

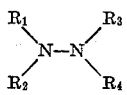

where $R_1$ and $R_2$ are each selected from the group consisting of hydrogen and hydrocarbon radicals, and $R_3$ and $R_4$ are each selected from the group consisting of hydrogen, alkyl radicals, hydroxyalkyl radicals and halophenyl radicals, at least one of the radicals, $R_1$, $R_2$, $R_3$ and $R_4$ being hydrogen. Examples of suitable hydrazine treating agents are: hydrazine, methyl hydrazine, symmetrical dimethyl hydrazine, asymmetrical dimethyl hydrazine, asymmetrical methyl ethyl hydrazine, asymmetrical diethyl hydrazine, trimethyl hydrazine, octyl hydrazine, phenyl hydrazine, asymmetrical diphenyl hydrazine, asymmetrical methyl phenyl hydrazine, N-cyclohexyl hydrazine, N-hydroxyethyl hydrazine, N,N,N'-trihydroxyethyl hydrazine, N-(chlorophenyl) hydrazine, etc. Preferably, the hydrazine treating agent according to the invention contains not more than 50 carbon atoms in the molecule, and more preferably not more than 15 carbon atoms. Preferably $R_1$ and $R_2$, if hydrocarbon radicals, are saturated hydrocarbon radicals, rather than aromatic or olefinic radicals.

Any suitable metallic hydrogenation catalyst can be employed in the process according to the invention. Such catalysts constitute a well known class of materials, which class is generally operative to produce the especially effective conversion of unstable constituents according to the invention. Metallic hydrogenation catalysts such as nickel, cobalt, platinum, palladium, molybdenum, oxides or sulfides of such metals, etc. are examples of preferred catalysts for use according to the invention, but other members of known classes of metallic hydrogenation catalysts can also be employed. Preferably, the hydrogenation catalyst is associated with an adsorbent carrier such as activated carbon, clay, kieselguhr, silica gel, bauxite, fuller's earth, silica-alumina composites, etc.

The process according to the invention can be carried out at any suitable temperature within the approximate range from atmospheric temperature to 650° F. Preferably the temperature is within the approximate range from 150° F. to 450° F. At the higher contacting temperatures, the hydrazine treating agent employed is preferably one which has relatively high molecular weight, in order that the treating agent does not have excessive volatility at the temperature employed. It is not essential however that the hydrazine treating agent be in liquid phase at the contacting temperature, since the invention contemplates in one embodiment the contacting of petroleum products with a hydrazine treating agent in vapor phase.

The amount of hydrazine or derivative thereof (anhydrous basis) is preferably within the approximate range from 0.005 to 0.5 weight percent based on the petroleum treated. However, larger amounts may be needed where the petroleum contains particularly large amounts of constituents which it is desired to react with the hydrazine treating agent.

The contacting of the hydrocarbon fraction with the nitrogenous treating agent and the hydrogenation catalyst can be brought about in any suitable manner. Preferably a mixture of the hydrocarbons and the nitrogenous treating agent is passed through a stationary bed of solid granular hydrogenation catalyst at a liquid hourly space velocity within the approximate range from 0.1 to 10 volumes of hydrocarbons per volume of catalyst bed per hour. Preferably the time of contacting of the hydrocarbons with the nitrogenous treating agent and hydrogenation catalyst is within the approximate range from 1 to 60 minutes, although other contacting times can be employed if desired.

In one embodiment of the invention, the nitrogenous treating agent is dissolved in the hydrocarbon fraction and the resulting solution contacted with the hydrogenation catalyst. The amount of nitrogenous treating agent relative to hydrocarbons which can be employed in this embodiment is limited by the solubility of the nitrogenous treating agent in the hydrocarbons.

In another embodiment, a greater amount of nitrogenous treating agent is employed than that which is soluble in the hydrocarbons, and means are provided for effecting intimate contact of the treating agent with the hydrocarbons. Preferably, such intimate contact is provided by forming a dispersion of one phase in another, which dispersion is stable for at least the desired treating period. This dispersion can be formed in any suitable known manner for dispersion of immiscible liquids one in the other. Thus for example the dispersion may be brought about by vigorous agitation, for example by subjection to ultrasonic vibration or other means. The dispersion can also be brought about by the use of a suitable emulsifying agent, for example a water-in-oil emulsifying agent, for preparation of a dispersion of the nitrogenous treating agent or an aqueous solution thereof in the hydrocarbon fraction.

Any suitable means can be employed for resolving the dispersion after the treating period. Thus for example the treating agent can be stripped out of the treated hydrocarbons. Alternatively, ultrasonic vibrations of suitable frequency for resolution of emulsions can be employed, or demulsifying agents can be added in order to resolve the emulsion into its components. Such resolution operations are generally well known in the art, and a person skilled in the art can in the light of the present specification select suitable means for resolving the emulsion in a given instance.

The nitrogenous treating agent employed according to the invention can be used in substantially anhydrous form. Alternatively it may be used in the form of an aqueous solution or dispersion.

The process is generally applicable to hydrocarbon mixtures which contain unstable constituents contributing to poor oxidation stability or color stability, e.g. petroleum fractions such as motor lubricants, transformer oils, cable oils, refrigerator oils, rubber processing oils, fuel oil fractions, etc. as well as shale oil fractions.

The following example illustrates the invention:

0.4 weight percent of hydrazine, $N_2H_4$, is dissolved in a petroleum lubricating oil fraction having Saybolt Universal viscosity at 100° F. of about 500 seconds, Saybolt Universal viscosity at 210° F. of about 50 seconds, and A.P.I. gravity of about 20. The resulting solution is percolated in liquid phase at 250° F. through a bed of 4 to 10 mesh hydrogenation catalyst comprising 20% molybdenum disulfide on alumina. The liquid hourly space velocity is 0.25 volume of oil per volume of catalyst bed per hour. The product is blown with air to remove excess hydrazine and any water which may have been formed during the treating operation. The color of the oil and the ability of the oil to resist discoloration upon subjection to elevated temperatures and oxygen for long periods of time are substantially improved as a result of the treatment. The improvement in color and color stability is particularly good as a result of the action of the molybdenum disulfide on the hydrazine during the treatment, the molybdenum disulfide promoting decomposition of the hydrazine to produce decomposition products which are highly reactive with the unstable constituents in the lubricating oil.

Generally similar results are obtained employing other nitrogenous treating agents such as those disclosed previously, e.g. a 54% aqueous solution of hydrazine, substantially anhydrous symmetrical dimethyl hydrazine, trihydroxyethyl hydrazine, etc. Generally similar results are also obtained employing a hydrogenation catalyst such as a mixture of cobalt oxide and molybdenum oxide on an alumina base, the catalyst containing 0.8 part by weight of cobalt and 6.5 parts of molybdenum per 100 parts of alumina, or other hydrogenation catalyst as previously disclosed.

The invention claimed is:

1. Process for refining hydrocarbons which comprises contacting a hydrocarbon mixture containing unstable constituents including nitrogen compounds causing unsatisfactory color stability with a treating agent having the formula:

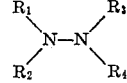

where $R_1$ and $R_2$ are each selected from the group consisting of hydrogen and hydrocarbon radicals, and $R_3$ and $R_4$ are each selected from the group consisting of hydrogen, alkyl radicals, hydroxyalkyl radicals and halophenyl radicals, at least one of the radicals, $R_1$, $R_2$, $R_3$ and $R_4$ being hydrogen, at a temperature within the approximate range from room temperature to 650° F. in the presence of a metallic hydrogenation catalyst selected from the group consisting of nickel, cobalt, platinum, palladium, molybdenum, and oxides and sulfides of such metals, said catalyst being intimately contacted with the hydrocarbon mixture, whereby said catalyst promotes decomposition of the treating agent to produce decomposition products which are highly reactive with said unstable constituents.

2. Process according to claim 1 wherein said treating agent comprises hydrazine.

3. Process according to claim 2 wherein said treating agent comprises an aqueous solution of hydrazine.

4. Process according to claim 1 wherein said treating agent comprises trihydroxyethyl hydrazine.

5. Process according to claim 1 wherein said temperature is within the approximate range from 150 to 450° F.

6. Process according to claim 1 wherein said contacting is effected by percolating the hydrocarbon mixture in the presence of said compound through a bed of granular hydrogenation catalyst.

7. Process according to claim 1 wherein said temperature is at least 250° F.

8. Process according to claim 1 wherein said hydrocarbon mixture is a petroleum lubricating oil.

References Cited in the file of this patent
UNITED STATES PATENTS

| | | |
|---|---|---|
| 2,767,119 | Forchielli | Oct. 16, 1956 |
| 2,867,577 | Urban et al. | Jan. 6, 1959 |

OTHER REFERENCES

Kalichevsky et al.: "Petroleum Refining With Chemicals," pages 486–493, 504–507, 1956, New York.